April 16, 1968　　　V. D. CROCHERON　　　3,378,209
CORROSION-PROOF LINING FOR METALLURGICAL GRINDING MILLS
Filed Aug. 30, 1965　　　　　　　　　　　　2 Sheets-Sheet 2

INVENTOR.
VOLNEY D. CROCHERON
BY
ATTORNEYS

United States Patent Office 3,378,209
Patented Apr. 16, 1968

3,378,209
CORROSION-PROOF LINING FOR METAL-
LURGICAL GRINDING MILLS
Volney D. Crocheron, Salt Lake City, Utah, assignor to
The Galigher Company
Filed Aug. 30, 1965, Ser. No. 483,561
12 Claims. (Cl. 241—102)

ABSTRACT OF THE DISCLOSURE

For ball or rod mills, a corrosion and wear resistant rubber lining formed of individual pieces or sections adapted to fit closely together and to be secured to the inner face of the shell of the mill. Certain of the pieces include fastening means comprising an elongate channel element of metal wholly embedded in and vulcanized to the rubber material with its channel opening facing the back of the lining piece and opening thereinto so as to slidably receive and retain the heads of securement bolts whose shanks are passed through receiving holes in the mill lining. In order to protect the channel elements and bolts against corrosion, the channels are filled with rubber or rubber-like material, and sleeves of the same material are fitted on the shanks of the bolts.

---

Figure 1:
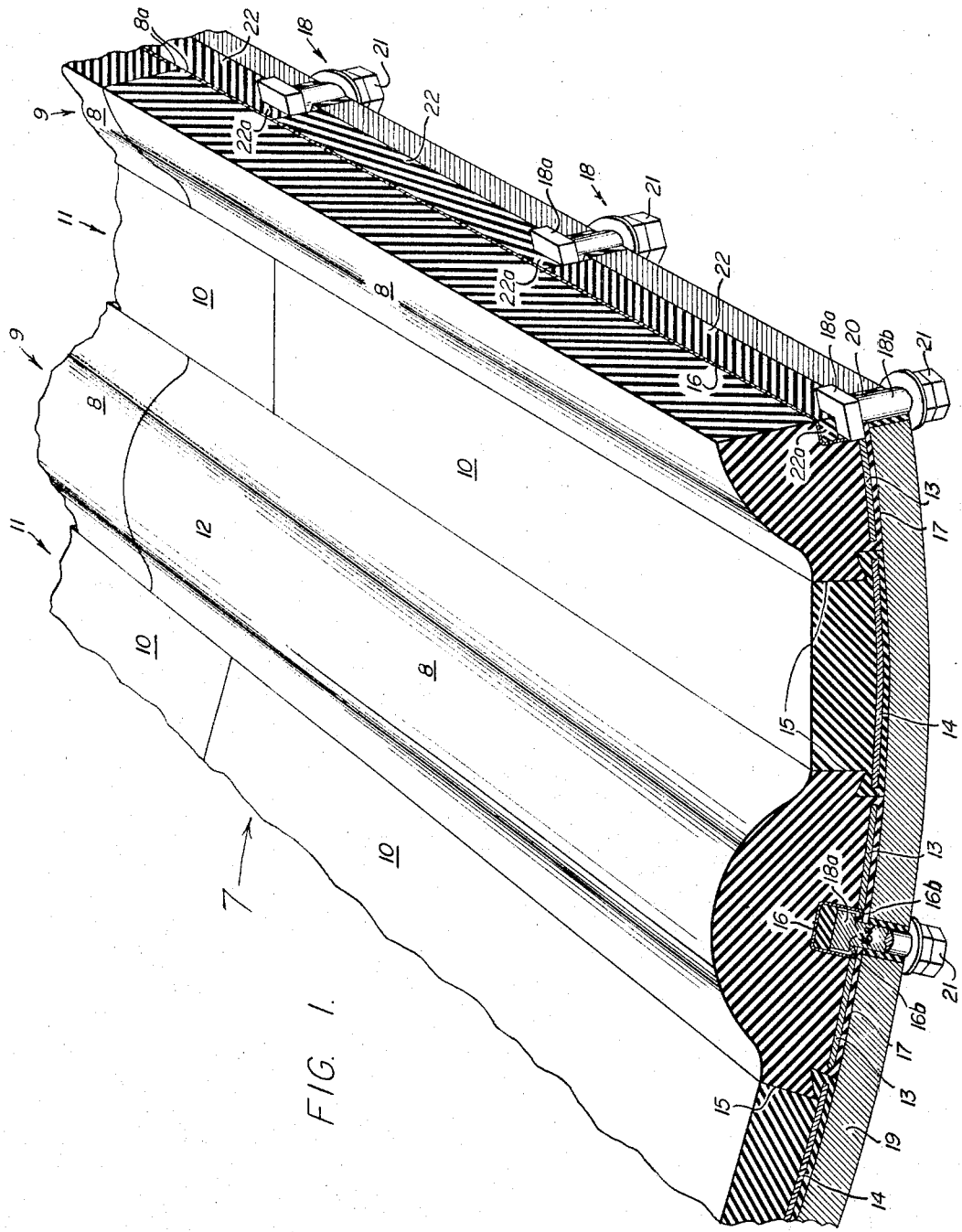

This invention relates to corrosion and wear resistant linings for metallurgical grinding mills of the type of ball mills, rod mills, and pebble mills, and particularly to such linings made of a rubber-like material, e.g. natural or synthetic rubber.

Linings of this type are shown in U.S. Patent No. 1,921,672, granted to F. L. Haushalter on Aug. 8, 1933, and in U.S. Patent No. 3,107,867, granted to A. N. Svensson et al. on Oct. 22, 1963.

The primary objective in the making of the present invention was to provide improvements that permit corrosion-proof linings of unlimited length, that enable fastenings to the shell of a grinding mill to be variable in spacing so there is no need to redrill such shell in installing new linings in old mills, and that make for practically a complete corrosion-proof lining which is capable of variations in functional design to meet a wide range of grinding requirements and which can be positively fastened in place by standard bolts, without destroying corrosion resistance.

This objective was met and the desired improvements provided by vulcanizing, into individual pieces of rubber-like lining, respective elongate and rigid channels having inturned sides for retaining and for being clamped by bolt heads inserted into such channels from open ends thereof. In this manner, not only do such channels provide for the desired anchorage to the mill shell of the individual lining pieces, and of other lining pieces that may be arranged for clamping and anchorage by such individual lining pieces, but they also advantageously supplement structural reinforcing otherwise provided for such individual lining pieces. Moreover, this is done without in any way limiting the lengths of the individual lining pieces or the contours of their exposed work faces. Thus, for example, lifters for balls, rods, pebbles, or other grinding media may be formed in such manner as to retain lining slabs in place, or the lining slabs themselves may be provided with lifter configurations and be constructed for direct anchorage to the mill shell.

For maximum corrosion resistance, strips of rubber or similar material are desirably inserted within the channels between the bolt heads as linings or fillers for such channels.

There are shown in the accompanying drawings several embodiments of the invention representative of what is presently regarded as the best mode of carrying it out in actual practice. From the following detailed description, other more specific objects and features will become apparent.

Figure 2:
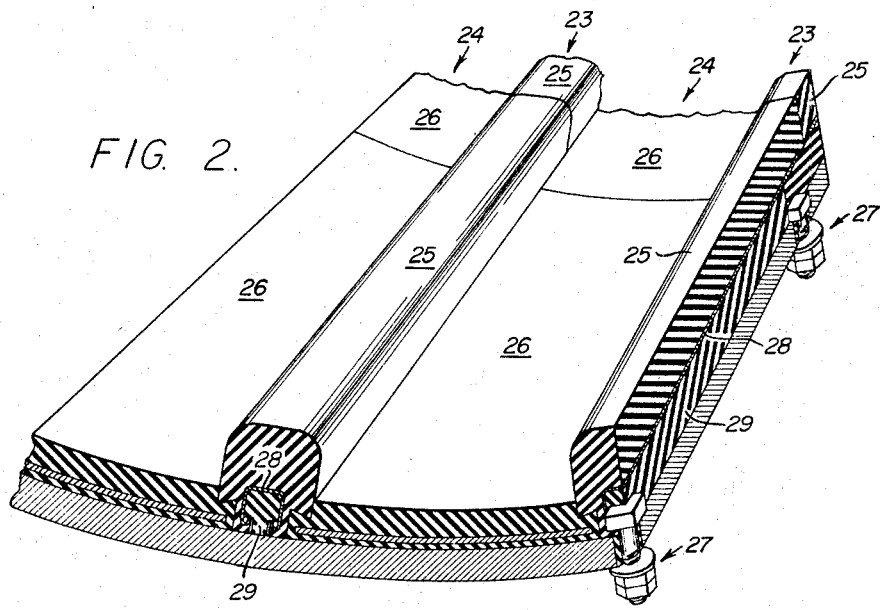
Figure 3:
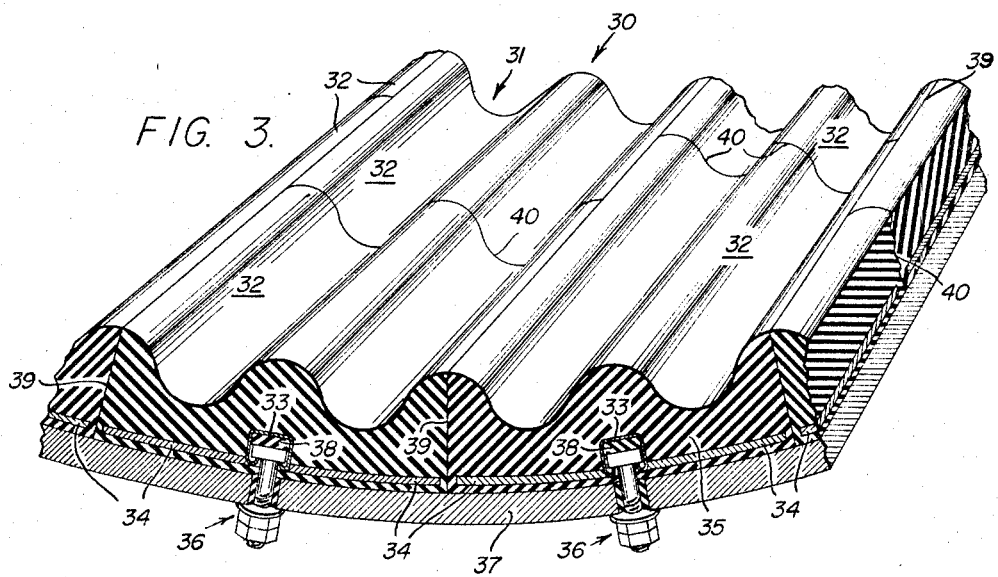

In the drawings:

FIG. 1 represents a fragmentary portion of a conventional metallurgical grinding mill having a rubber lining conforming to the invention, such portion being illustrated isometrically from the inside of the mill, and showing both transverse and longitudinal sections of the lining;

FIG. 2, a similar view showing a somewhat different embodiment of the invention; and FIG. 3, another similar view showing yet a different embodiment of the invention.

Referring to the drawings:

The embodiment of FIG. 1 incorporates lining that has a corrugated front surface 7 of what might be regarded as a wave formation exposed to the interior of the mill as the working surface. It is made up from individual lifter pieces 8, providing the ridges 9 of the corrugations, and from slab pieces or belly plates 10, providing the valleys 11 between ridges. The pieces are of convenient length for handling, usually from thirty to fifty inches, and have preferably squared ends for straight, end-to-end abutment joinders, as at 12, preferably staggered in arrangement from piece to piece, as shown. They are molded to shape from a rubber-like material, such as natural or synthetic rubber.

In this embodiment, only the lifter pieces 8 are provided with fastening means for anchoring the lining to the mill shell. The slab pieces 10 are without fastening means, and are held in place by the lifter pieces. As here shown, the pieces of both types are structurally reinforced by rigid plates 13 and 14, respectively, which are advantageously steel, and are provided with mutually interlocking formations 15 that provide for the lifter pieces 8 to overlap the slab pieces 10 and clamp them in place.

The fastening means for each of the lifter pieces include an elongate channel element 16 of some suitable rigid material, such as strip steel rolled and drawn to channel shape, with inturned legs 16a to make the channel interior re-entrant. Such channel element is somewhat shorter than the length of the lifter piece 8 and is embedded and securely vulcanized into the rubber-like material, with its channel open to the back or non-working surface 17 of the liner piece and open at the ends, but with its ends covered and protected by the rubber-like material, as at 8a. This is easily accomplished by molding the rubber-like material across the open ends of the channels, which are temporarily plugged to prevent entry of such material thereinto, and by cutting out the molded material at the openings, leaving it flush with the inner wall surfaces of the channel elements.

It is preferable that the plate reinforcement 13 be in two elongate pieces, spaced apart by the width of the channel opening and secured together by welding to the superimposed channel element 16, as illustrated.

The fastening means also include bolts 18, whose heads 18a are slid into the channel element 16 from an open end thereof and are spaced in accordance with the spacing of the bolt holes in the particular mill shell concerned, either new or old, for example, the mill shell 19. As indicated, the bolt heads 18a are retained by the inturned legs 16a of the channel, and the bolt shanks 18b extend through the channel opening and through the holes of the shell 19, which are preferably lined with rubber-like material, as by use of rubber sleeves 20 that are slightly longer than mill shell thickness. Nut and washer assemblies 21 are used to tightly cinch the liner pieces against the interior surface of the mill shell.

In this embodiment of FIG. 1, there are three bolts 18 spaced along the length of each channel 16. This is normally the maximum number used with the longer lining pieces. Between and covering the bolt heads 18a in each channel are extruded T-shaped lengths 22 of rubber-like material, which are pushed into place from the open ends of the channel at the time the bolts are being inserted in the channel. Ends of such lengths 22 are notched as required to provide caps 22a covering the bolt heads. These lengths serve as protective fillers for the channels right down to the inside face of the mill shell 19 and guard against internal corrosion. They can be greased, or lubricated in some other manner, for easy insertion, but essentially a friction seal is relied on to exclude liquids. As a practical matter, the curls 16b of the channels require no filler, though the extrusions can be made to fill these also if ever found desirable. Other ways of protectively lining the channels internally can be employed, but the described method using extruded inserts is convenient and relatively in expensive.

The end-to-end abutment joinders 12, like the side-to-side overlap joinders 15, involve only the rubber-like material and are, thus essentially fluid tight. Extruded lengths 22 are inserted to extend between the end bolts of the respective lifter pieces 8 and to bridge the lines of joinder.

The embodiment of FIG. 2 presents a different front or working surface contour for the lining, in that the lifters 23 are of bar formation rising abruptly from relatively wide intermediate flat areas 24 in accordance with a customary design for mill linings of conventional construction.

The individual lifter pieces 25 are narrower than the corresponding pieces 8 of the first embodiment and the individual slab pieces 26 are wider than the corresponding pieces 10, but the fastening arrangement is essentially the same. Although three bolts can be used, as in the previous embodiment, only two bolts 27 are shown for each channel element 28, and there are no plate reinforcements as there are in the lifter pieces 8. Filler strips 29 are preferably used in the channel element 28, as in the previous embodiment. The individual slab pieces 26 are similar in construction to the slab pieces 10.

The front or working surface contour of the embodiment of FIG. 3 is corrugated in a uniform wave pattern whose ridges 30 and valleys 31 are similar in contour, the ridges serving as lifters. The several lining pieces 32 are identical in formation, each being provided with fastening means corresponding to the fastening means of FIG. 1. Thus, a channel element 33, extending longitudinally and centrally of the lining piece, is welded along its length to structural reinforcement plates 34, and the entire assembly is vulcanized into the rubber-like material 35 of the piece during the molding operation. From one to three bolts 36 are utilized to clamp the piece firmly in place against the mill shell 37, and filler strips 38 are advantageously utilized, as in the foregoing embodiment. The sides of the lining pieces 32 are preferably plane surfaces extending along the mill radius. They abut face-to-face at 39, as do the end surfaces at 40.

It should be noted that the lining of this invention can be installed without difficulty over any membrane lining previously applied to the inner face of the mill shell and mill heads, and that head lining pieces similar in construction and fastening arrangements to the shell liner pieces previously described, but in the form of segments of a circle, will normally be used in conjunction with the shell lining previously described for complete corrosion and wear proofing of the mill.

Whereas, there are here illustrated and specifically described embodiments presently regarded as representative of the best mode of carrying out the invention, it should be understood that various changes may be made and other constructions adopted without departing from the inventive subject matter particularly pointed out and claimed herebelow.

I claim:

1. A corrosion and wear resistant lining for metallurgical grinding mills, comprising individual pieces of lining of rubber-like material adapted to fit together on the inner surface of the shell of such a mill to form substantially liquid-tight joinders therebetween and to be securely fastened to such shell; fastening means associated with at least some of the lining pieces as structural reinforcements therefor, each fastening means including an elongate channel element of rigid corrosive, structural material wholly embedded in and vulcanized into secure engagement with its lining piece so that its channel is open to and its legs are protectively covered, said back surface of the lining piece, the legs of the channel element being inturned to retain bolt heads introduced into the channel; and filler strips of rubber-like material adapted to closely fit the interior of the channel element between adjacent bolt heads for protectively covering interior surfaces of the channel element.

2. A lining according to claim 1, wherein there are additionally provided plates of rigid structural material embedded in at least some of the lining pieces and rigidly secured to the sides of the channel elements adjacent the channel openings thereof as structural reinforcement for the lining pieces.

3. A lining according to claim 1, wherein each of the individual pieces has its front face corrugated to provide lifters for material being processed by the mill.

4. A lining according to claim 1, wherein the filler strips are of T-shape and extend to contact with the mill shell.

5. A lining according to claim 1, wherein the channels are deeper than the bolt heads, and the filler strips are notched to provide cap portions covering the bolt heads.

6. A lining according to claim 1, wherein there are additionally provided sleeves of rubber-like material adapted to protectively cover the shanks of the bolts.

7. In a metallurgical grinding mill having a shell subject to wear and corrosion, a corrosion and wear resistant lining comprising individual pieces of lining of rubber-like material fitted together on the inner surface of the shell to form liquid-tight joinders therebetween; fastening means associated with at least some of the lining pieces for securely fastening the lining to the shell, each fastening means including an elongate channel element of rigid, corrosive, structural material wholly embedded in and vulcanized into secure engagement with its lining piece so that its channel is open to the back surface of the lining piece and its legs are protectively covered, said legs of the channel element being inturned to retain bolt heads introduced into the channel, and bolts having their heads slidably retained in and by the channel element and their shanks extending through receiving openings in said shell; and filler strips of rubber-like material closely fitted into the interior of the respective channel elements, between adjacent bolt heads, for protectively covering interior surfaces of the channel elements.

8. The combination recited in claim 7, wherein the filler strips are of T-shape and extend to contact with the mill shell.

9. The combination recited in claim 7, wherein the channels are deeper than the bolt heads, and the filler strips are notched to provide cap portions covering the bolt heads.

10. The combination recited in claim 7, wherein there are additionally provided sleeves of rubber-like material protectively covering the shanks of the bolts.

11. The combination recited in claim 7, wherein there are additionally provided plates of rigid structural material embedded in at least some of the lining pieces and rigidly secured to the sides of the channel elements adjacent the channel openings thereof as structural reinforcement for the lining pieces.

12. The combination recited in claim 7, wherein each of the individual pieces has its front face corrugated to provide lifters for material being processed by the mill.

References Cited

UNITED STATES PATENTS

| | | | |
|---|---|---|---|
| 1,601,956 | 10/1926 | Gammeter | 241—183 |
| 2,058,257 | 10/1936 | Porteous | 241—102 |
| 3,107,867 | 10/1963 | Svensson et al. | 241—183 |

GERALD A. DOST, *Primary Examiner.*

UNITED STATES PATENT OFFICE
CERTIFICATE OF CORRECTION

Patent No. 3,378,209              April 16, 1968

Volney D. Crocheron

It is certified that error appears in the above identified patent and that said Letters Patent are hereby corrected as shown below:

Column 4, lines 30, 31 and 32, cancel "channel is open to and its legs are protectively covered, said back surface of the lining piece, the legs of the channel" and insert -- channel is open to the back surface of the lining piece and its legs are protectively covered, said legs of the channel --.

Signed and sealed this 26th day of August 1969.

(SEAL)
Attest:

Edward M. Fletcher, Jr.             WILLIAM E. SCHUYLER, JR.
Attesting Officer                     Commissioner of Patents